United States Patent
Chou et al.

(10) Patent No.: US 12,506,522 B2
(45) Date of Patent: Dec. 23, 2025

(54) METHOD AND APPARATUS FOR CODEBOOK-BASED PHYSICAL UPLINK SHARED CHANNEL (PUSCH) TRANSMISSION

(71) Applicant: SHARP KABUSHIKI KAISHA, Sakai (JP)

(72) Inventors: Po-Chun Chou, Taipei (TW); Chia-Hung Lin, Taipei (TW); Mei-Ju Shih, Taipei (TW); Wan-Chen Lin, Taipei (TW); Yen-Hua Li, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 7 days.

(21) Appl. No.: 18/771,848

(22) Filed: Jul. 12, 2024

(65) Prior Publication Data

US 2025/0030465 A1    Jan. 23, 2025

Related U.S. Application Data

(60) Provisional application No. 63/526,542, filed on Jul. 13, 2023.

(51) Int. Cl.
*H04B 7/02*    (2018.01)
*H04B 7/0456*    (2017.01)

(52) U.S. Cl.
CPC .................. *H04B 7/0473* (2013.01)

(58) Field of Classification Search
CPC .. H04B 7/0473; H04B 7/0456; H04B 7/0404; H04L 5/0048; H04W 72/232

(Continued)

(56) References Cited

U.S. PATENT DOCUMENTS

| 11,522,594 B2 * | 12/2022 | Liu ................... H04B 7/063 |
| 2022/0030576 A1 * | 1/2022 | Sakhnini ............. H04L 5/0048 |
| 2024/0251405 A1 | 7/2024 | Matsumura et al. |

FOREIGN PATENT DOCUMENTS

| WO | 2023002610 A1 | 1/2023 |
| WO | 2023004062 A1 | 1/2023 |

OTHER PUBLICATIONS

CMCC: "Discussion on SRI/TPMI enhancement for enabling 8 TX UL transmission", RI-2204293, 3GPP TSG RAN WG1 #109-e, e-Meeting, May 9-20, 2022 (Apr. 29, 2022).

* cited by examiner

*Primary Examiner* — Helene E Tayong
(74) *Attorney, Agent, or Firm* — ScienBiziP, P.C.

(57) ABSTRACT

A method for performing codebook-based Physical Uplink Shared Channel (PUSCH) transmission by a User Equipment (UE) is provided. The method receives a Radio Resource Control (RRC) message including a PUSCH configuration indicating a codebook-based PUSCH transmission. The method receives a Downlink Control Information (DCI) format including a first field and a second field. The first field indicates an 8-port Sounding Reference Signal (SRS) resource. The second field indicates an index associated with a Transmission Precoding Matrix Indicator (TPMI) and the number of transmission layers. The method determines the number of codewords to be one or two based on the number of transmission layers. The method determines a codeword-to-layer mapping for spatial multiplexing based on the number of transmission layers and the number of codewords. The method determines a precoding matrix based on the index and the codeword-to-layer mapping. The method performs the codebook-based PUSCH transmission using the precoding matrix.

20 Claims, 3 Drawing Sheets

(58) Field of Classification Search
USPC .......................................................... 375/267
See application file for complete search history.

METHOD AND APPARATUS FOR CODEBOOK-BASED PHYSICAL UPLINK SHARED CHANNEL (PUSCH) TRANSMISSION

CROSS-REFERENCE TO RELATED APPLICATION(S)

The present application claims the benefit of and priority to U.S. Provisional Patent Application Ser. No. 63/526,542, filed on Jul. 13, 2023, entitled "METHOD AND APPARATUS TO LAYER MAPPING AND ANTENNA PORT MAPPING FOR 8TX UL TRANSMISSION," the content of which is hereby incorporated herein fully by reference into the present disclosure for all purposes.

FIELD

The present disclosure is related to wireless communication and, more specifically, to User Equipment (UE), Base Station (BS), and method for codebook-based Physical Uplink Shared Channel (PUSCH) transmission in wireless communication networks.

BACKGROUND

Various efforts have been made to improve different aspects of wireless communication for the cellular wireless communication systems, such as the 5th Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). As the demand for radio access continues to increase, however, there exists a need for further improvements in the next-generation wireless communication systems.

SUMMARY

The present disclosure is related to a UE, a BS, and a method for codebook-based PUSCH transmission in cellular wireless communication networks.

In a first aspect of the present application, a method performed by a UE for codebook-based PUSCH transmission is provided. The method includes receiving, from a BS, a Radio Resource Control (RRC) message including a PUSCH configuration, the PUSCH configuration indicating a codebook-based PUSCH transmission; receiving, from the BS, a Downlink Control Information (DCI) format including a first field and a second field, the first field indicating an 8-port Sounding Reference Signal (SRS) resource, and the second field indicating an index that is associated with a Transmission Precoding Matrix Indicator (TPMI) and a number of transmission layers; determining a number of codewords to be one in a case that the number of transmission layers is less than or equal to four; determining the number of codewords to be two in a case that the number of transmission layers is greater than four; determining a codeword-to-layer mapping for spatial multiplexing based on the number of transmission layers and the number of codewords; determining a precoding matrix based on the index and the codeword-to-layer mapping for the spatial multiplexing; and performing the codebook-based PUSCH transmission using the precoding matrix.

In some implementations of the first aspect, in the case that the number of transmission layers is less than or equal to four: a first codeword is used for the codeword-to-layer mapping for the spatial multiplexing, and complex-valued modulation symbols belonging to the first codeword are mapped to transmission layers in sequence.

In some implementations of the first aspect, in the case that the number of transmission layers is greater than four: a first codeword and a second codeword are used for the codeword-to-layer mapping for the spatial multiplexing, in a case that the number of transmission layers is five, complex-valued modulation symbols belonging to the first codeword are mapped to first two transmission layers in sequence and complex-valued modulation symbols belonging to the second codeword are mapped to third to fifth transmission layers in sequence, in a case that the number of transmission layers is six, complex-valued modulation symbols belonging to the first codeword are mapped to first three transmission layers in sequence and complex-valued modulation symbols belonging to the second codeword are mapped to fourth to sixth transmission layers in sequence, in a case that the number of transmission layers is seven, complex-valued modulation symbols belonging to the first codeword are mapped to first three transmission layers in sequence and complex-valued modulation symbols belonging to the second codeword are mapped to fourth to seventh transmission layers in sequence, and in a case that the number of transmission layers is eight, complex-valued modulation symbols belonging to the first codeword are mapped to first four transmission layers in sequence and complex-valued modulation symbols belonging to the second codeword are mapped to fifth to eighth transmission layers in sequence.

In some implementations of the first aspect, the PUSCH configuration further indicates a maximum transmission rank, a transform precoding configuration, and a codebook subset configuration. Determining the precoding matrix includes determining a dedicated table based on the maximum transmission rank, the transform precoding configuration, and the codebook subset configuration; and determining the precoding matrix based on the dedicated table and the index.

In some implementations of the first aspect, the maximum transmission rank is one of 1, 2, 4, and 8.

In some implementations of the first aspect, the codebook subset configuration indicates a number of antenna groups, transmission antenna ports that belong to a same antenna group are regarded as coherent, and the number of antenna groups is one of 1, 2, 4, and 8.

In some implementations of the first aspect, in a case that the number of antenna groups is 2 or 4: the index corresponds to a plurality of sub-indices, the plurality of sub-indices is grouped into a plurality of pairs sequentially, the number of the plurality of pairs is equal to the number of antenna groups, and each of the plurality of pairs corresponds to a sub-precoding matrix that is applied to each antenna group.

In some implementations of the first aspect, the plurality of pairs comprises a first pair and a second pair, each of the first and second pairs includes a first sub-index and a second sub-index, the first sub-index corresponds to the number of transmission layers, the second sub-index corresponds to a sub-TPMI, and the first sub-index of the first pair is different from the first sub-index of the second pair.

In some implementations of the first aspect, the first field includes an SRS Resource Indicator (SRI).

In a second aspect of the present application, a UE for performing codebook-based PUSCH transmission is provided. The UE includes at least one processor and at least one non-transitory computer-readable medium that is coupled to the at least one processor and that stores one or more computer-executable instructions. The computer-executable instructions, when executed by the at least one processor, cause the UE to: receive, from a BS, an RRC message including a PUSCH configuration, the PUSCH configuration indicating a codebook-based PUSCH transmission; receive, from the BS, a DCI format including a first field and a second field, the first field indicating an 8-port SRS resource, and the second field indicating an index that is associated with a TPMI and a number of transmission layers; determine a number of codewords to be one in a case that the number of transmission layers is less than or equal to four; determine the number of codewords to be two in a case that the number of transmission layers is greater than four; determine a codeword-to-layer mapping for spatial multiplexing based on the number of transmission layers and the number of codewords; determine a precoding matrix based on the index and the codeword-to-layer mapping for the spatial multiplexing; and perform the codebook-based PUSCH transmission using the precoding matrix.

In a third aspect of the present application, a BS for configuring codebook-based PUSCH transmission is provided. The BS includes at least one processor and at least one non-transitory computer-readable medium that is coupled to the at least one processor and that stores one or more computer-executable instructions. The computer-executable instructions, when executed by the at least one processor, cause the BS to: transmit, to a UE, an RRC message including a PUSCH configuration, the PUSCH configuration indicating a codebook-based PUSCH transmission; and transmit, to the UE, a DC) format including a first field and a second field, the first field indicating an 8-port SRS resource, and the second field indicating an index that is associated with a TPMI and a number of transmission layers. The DCI format enables the UE to: determine a number of codewords to be one in a case that the number of transmission layers is less than or equal to four; determine the number of codewords to be two in a case that the number of transmission layers is greater than four; determine a codeword-to-layer mapping for spatial multiplexing based on the number of transmission layers and the number of codewords; determine a precoding matrix based on the index and the codeword-to-layer mapping for the spatial multiplexing; and perform the codebook-based PUSCH transmission using the precoding matrix.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
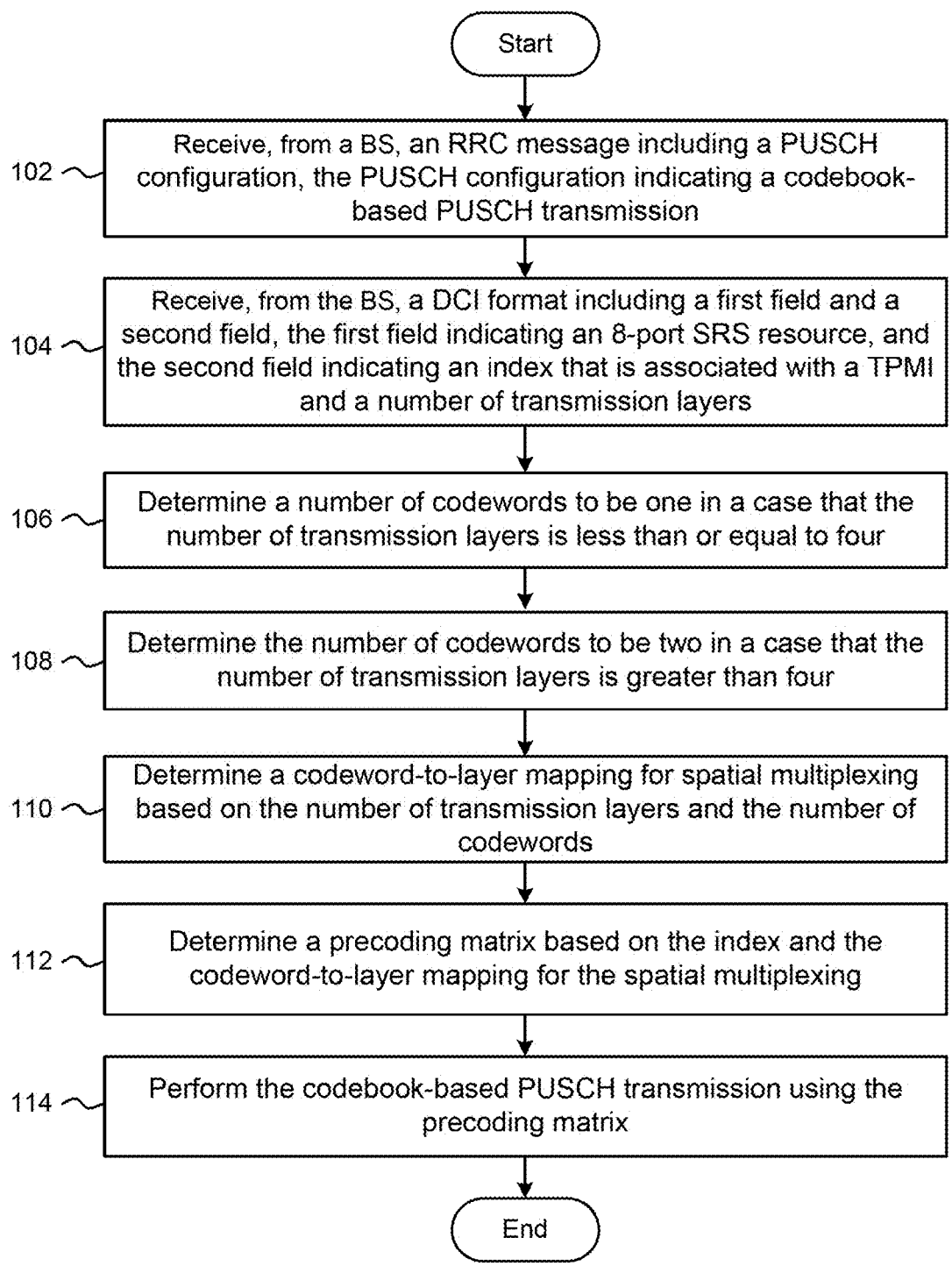
FIG. 1 is a flowchart illustrating a method/process for a UE for performing codebook-based PUSCH transmission, according to an example implementation of the present disclosure.

Some abbreviations used in the present disclosure include:

| Abbreviation | Full name |
| --- | --- |
| 3GPP | $3^{rd}$ Generation Partnership Project |
| 5G | $5^{th}$ Generation |
| ACK | Acknowledgment |
| BS | Base Station |
| BWP | Bandwidth Part |
| CA | Carrier Aggregation |
| CB | Codebook-Based |
| CC | Component Carrier |
| CG | Configured Grant |
| CN | Core Network |
| CPE | Customer Premises Equipment |
| CRC | Cyclic Redundancy Check |
| DC | Dual Connectivity |
| DCI | Downlink Control Information |
| DL | Downlink |
| DMRS | Demodulation Reference Signal |
| E-UTRA | Evolved Universal Terrestrial Radio Access |
| FDD | Frequency Division Duplexing |
| FR | Frequency Range |
| FWA | Fixed Wireless Access |
| HARQ | Hybrid Automatic Repeat Request |
| HARQ-ACK | HARQ Acknowledgement |
| ID | Identifier |
| IE | Information Element |
| LCID | Logical Channel ID |
| LSB | Least Significant Bit |
| LTE | Long Term Evolution |
| MAC | Medium Access Control |
| MAC CE | MAC Control Element |
| MCG | Master Cell Group |
| MCS | Modulation Coding Scheme |
| MIMO | Multi-Input Multi-Output |
| MN | Master Node |
| MSB | Most Significant Bit |
| MsgA | Message A |
| NAS | Non Access Stratum |
| NCB | Non-Codebook Based |
| NDI | New Data Indicator |
| NR | New Radio |
| NW | Network |
| OFDM | Orthogonal Frequency Division Multiplexing |
| PCell | Primary Cell |
| PDCCH | Physical Downlink Control Channel |
| PDSCH | Physical Downlink Shared Channel |
| PHY | Physical (layer) |
| PRACH | Physical Random Access Channel |
| PUCCH | Physical Uplink Control Channel |
| PUSCH | Physical Uplink Shared Channel |
| QCL | Quasi-colocation |
| RA | Random Access |
| RAN | Radio Access Network |
| RAR | Random Access Response |
| Rel | Release |
| RI | Rank Indicator |
| RF | Radio Frequency |
| RNTI | Radio Network Temporary Identifier |
| RRC | Radio Resource Control |
| RS | Reference Signal |
| SCell | Secondary Cell |
| SCG | Secondary Cell Group |
| SN | Secondary Node |
| SRI | SRS Resource Indicator |
| SRS | Sounding Reference Signal |
| TB | Transport Block |
| TDD | Time Division Duplexing |
| TPMI | Transmit Precoding Matrix Indicator |
| TRI | Transmission Rank Indication |
| TS | Technical Specification |

-continued

| Abbreviation | Full name |
|---|---|
| TX | Transmission |
| UE | User Equipment |
| UL | Uplink |
| URLLC | Ultra-Reliable and Low-Latency Communication |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and may not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "In some implementations," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS may be operable to provide radio coverage to a specific geographical area using multiple cells forming the RAN. The BS supports the operations of the cells. Each cell is operable to provide services to at least one UE within its radio coverage.

Each cell (may often referred to as a serving cell) may provide services to one or more UEs within the cell's radio coverage, such that each cell schedules the DL and optionally UL resources to at least one UE within its radio coverage for DL and optionally UL packet transmissions. The BS may communicate with one or more UEs in the radio communication system via the of cells.

A cell may allocate sidelink (SL) resources for supporting Proximity Services (ProSe) or Vehicle to Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may include the SpCell of an MCG. A Primary SCG Cell (PSCell) may include the SpCell of an SCG. MCG may include a group of serving cells associated with the Master Node (MN), including the SpCell and optionally one or more Secondary Cells (SCells). An SCG may include a group of serving cells associated with the Secondary Node (SN), including the SpCell and optionally one or more SCells.

As discussed above, the frame structure for NR supports flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically, Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following paragraphs, (sub)-bullets, points, actions, behaviors, terms, or claims described in the present disclosure may be combined logically, reasonably, and properly to form a specific method.

Any sentence, paragraph, (sub)-bullet, point, action, behaviors, terms, or claims described in the present disclosure may be implemented independently and separately to form a specific method.

Dependency, e.g., "based on", "more specifically", "preferably", "in one embodiment", "in some implementations", etc., in the present disclosure is just one possible example which would not restrict the specific method.

"A and/or B" in the present disclosure may include either A or B, both A and B, at least one of A and B.

Examples of some selected terms in the present disclosure are provided as follows.

Antenna Panel: an antenna panel is a conceptual term for UE antenna implementation. It may be assumed that a panel is an operational unit for controlling a transmission spatial filter (e.g., a beam). A panel may include multiple antenna elements. A beam may be formed by a panel, and two panels may be needed to form two beams simultaneously. Such simultaneous beamforming from multiple panels may be subject to UE capability. A similar definition for "antenna panel" may be possible by applying spatial receiving filtering characteristics.

Beam: the terms "beam" and "spatial filter" may be used interchangeably in the present disclosure. For example, when a UE reports a preferred gNB Tx beam, the UE is essentially selecting a spatial filter used by the gNB. The term "beam information" is used to provide information about which beam/spatial filter is being used/selected. In some implementations, individual reference signals are transmitted by applying individual beams (spatial filters). Thus, the term "beam" or "beam information" may be represented by reference signal resource index(es).

DCI: DCI stands for downlink control information and there are various DCI formats used in the PDCCH. The DCI format is a predefined format in which the downlink control information is packed/formed and transmitted in the PDCCH.

TCI state: a TCI state contains parameters for configuring a QCL relationship between one or two reference signals and a target reference signal set. For example, a target reference signal set may be the DM-RS ports of the PDSCH, PDCCH, PUCCH or PUSCH.

HARQ: HARQ is a functionality that ensures delivery between peer entities at Layer 1 (e.g., PHY Layer). A single HARQ process may support one TB when the PHY layer is not configured for DL/UL spatial multiplexing. A single HARQ process may support one or multiple TBs when the PHY layer is configured for DL/UL spatial multiplexing. There may be one HARQ entity per serving cell. Each HARQ entity may support parallel processing of (e.g., multiple) DL and UL HARQ processes.

Antenna port: an antenna port may be used for transmission of PUSCH(s) or PUCCH(s).

Antenna group: an antenna group may be a group including more than one antenna port where all antenna ports in the group are fully coherent.

Panel: a panel may be a group including one antenna port, more than one antenna port, one antenna group, or more than one antenna group.

$\rho$: $\rho$ may represent the number of antenna ports of the UE. For example, if the UE is equipped with 8 antenna ports (8 TX), $\rho$ is equal to eight.

Codebook: A fully coherent/partially coherent/noncoherent codebook (subset) may include one or multiple transmit precoding matrices. A fully coherent codebook subset may mean that all precoders in the corresponding codebook subset are fully coherent. A partially coherent codebook subset may mean that all precoders in the corresponding codebook subset are partially coherent. A noncoherent codebook subset may mean that all precoders in the corresponding codebook subset are non-coherent.

SRS-ports: antenna ports used for transmitting the SRS.

4TX codebook: codebooks used for uplink CB transmission when the UE is equipped with four antenna ports.

2TX codebook: codebooks used for uplink CB transmission when the UE is equipped with two antenna ports.

Nested coherence capability: in the present disclosure, the term "nested coherence capability" may refer to a coherence capability that includes all associated deriving capabilities. The nested coherence capability may cover all the sub-capabilities related to the deriving coherence. The coherence capability that supports the full-coherent precoders may also support the partial-coherent and noncoherent precoders. The coherence capability that supports the partial-coherent precoders may also support the noncoherent precoders. For example, a gNB/NW may configure a UE with the coherence capability supporting the full-coherent, partial-coherent, and noncoherent precoders. For example, a gNB/NW may configure a UE with the coherence capability supporting the partial-coherent and noncoherent precoders. For example, a gNB/NW may configure a UE with the coherence capability supporting the noncoherent precoders.

MIMO technology is one of the key technologies in the NR systems and is successful in commercial deployments. MIMO features were investigated and specified for both FDD and TDD systems, major parts of which were for a downlink MIMO operation. It is important to identify and specify necessary enhancements in the uplink MIMO. Also, necessary enhancements on the downlink MIMO that facilitate the use of large antenna array, not only for Frequency Range 1 (FR1), but also for Frequency Range 2 (FR2), may still need to be introduced to fulfill the evolution of NR deployments. Such enhancements may include the following areas.

Study and specify UL DMRS, SRS, SRI, and TPMI (including codebook) enhancements to enable an 8 Transmission Uplink operation (8 TX UL operation) to support 4 and more layers per UE in UL targeting CPE, FWA, vehicle, or industrial devices. Potential restrictions on the scope of this objective (including coherence assumption, full/non-full power modes) may be identified as part of the study. The 8 TX UL operation may mean that a UE has eight antenna ports in the UL transmission.

MIMO technology may be an effective way to increase the throughput of the NR systems (e.g., by increasing the maximum number of transmission layers and/or using beamforming techniques). The UL MIMO operation enhancement of the NR system may continue to evolve based on ongoing hardware advancements. Therefore, a UE having 8 TX may become a possible scenario.

In this scenario, the increased maximum number of transmission layers may make layer mapping a potential issue, where the layer mapping denotes the mechanism that maps complex-valued modulation symbols to the corresponding layers in a MIMO system. After the layer mapping is completed, all layers may be mapped to antenna ports by the corresponding nested precoding matrix. To consider the antenna port mapping, how to indicate a unique mapping for the system may be another potential issue. On the other hand, the size of the supported codebook subset(s) corresponding to different coherent conditions may increase due to the increased number of UL TX. Therefore, the nested indication for TPMI may no longer be suitable for use. Moreover, the nested indication for TPMI means that the configured codebook subset may be applied for at least one of the three coherent conditions. There may be three categories for the nested indication for TPMI: the configured codebook subset applied for the full-coherent, partial-coherent, and noncoherent conditions; the configured codebook subset applied for the partial-coherent and noncoherent conditions; and the configured codebook subset applied for the noncoherent condition. Accordingly, one possible approach for the TPMI indication is to separately configure a subset of codebooks suitable for the specific coherent conditions. For example, the configured codebook subset may be applied exclusively to the full-coherent, partial-coherent, or noncoherent conditions. However, this approach may result in the indication of the precoding matrix not being flexibly adjustable to channel the conditions. Therefore, another potential issue may be how to switch between different codebook subsets using signaling.

In this disclosure, implementations for the 8TX PUSCH transmission, including the approaches for layer mapping, antenna port mapping, and codebook subset switching, are disclosed.

UE Capability

A UE may report its UE capability by sending a (JECapabilityInformation message (e.g., via RRC signaling) to the gNB/NW after receiving a (JECapabilityEnquiry message (e.g., via RRC signaling) from the gNB/NW. The (JECapabilityInformation message may indicate at least one of the following: the maximum number of transmission layers for the CB PUSCH, the maximum number of SRS resources for the CB PUSCH per SRS resource set, the maximum number of simultaneous transmitted SRS resources for the CB PUSCH, the maximum number of SRS resources for the NCB PUSCH per SRS resource set, the maximum number of transmitted layers for the NCB PUSCH, the maximum number of simultaneous transmitted SRS resources for the NCB PUSCH, the supported codebook subset(s), the antenna port information (e.g., the number of antenna groups, layout configuration), and the maximum number of codewords.

The UE may use the field maxNumberMIMO-LayersCB-PUSCH in the Feature SetUplinkPerCC IE to report the maximum number of transmission layers for the CB PUSCH. The UE may use the field maxNumberMIMO-LayersNCB-PUSCH in the Feature SetUplinkPerCC IE to report the maximum number of transmission layers for the NCB PUSCH. The UE may use the field maxNumberSRS-ResourcePerSet in the Feature SetUplinkPerCC IE to report the maximum number of SRS resources for the CB PUSCH per SRS resource set. The UE may use the field maxNumberSimultaneousSRS-Resource Tx in the FeatureSetUplinkPerCC IE to report the maximum number of simultaneous transmitted SRS resources for the CB PUSCH. The UE may use one field in the FeatureSetUplinkPerCC IE to report the maximum number of SRS resources for the CB PUSCH per SRS resource set. The UE may use the field maxNumberSimultaneousSRS-Resource Tx in the FeatureSetUplinkPerCC IE to report the maximum number of simultaneous transmitted SRS resources for the NCB PUSCH. The UE may use the field pusch-TransCoherence in the MIMO-ParametersPerBand IE to report the supported codebook subset(s). The UE may use one or two fields in an IE to report the antenna port information. The UE may use one field in an IE to report the maximum number of codewords.

In some implementations, when a gNB/NW sends the UJECapabilityEnquiry message to a UE, the UE may report the maximum number of transmission layers for the CB PUSCH, which may be from one layer to v layers, by sending the (JECapabilityInformation message based on the UE capability. The UJECapabilityInformation message may include the field maxNumberMIMO-LayersCB-PUSCH. The UE may include, but is not limited to, a device with eight antenna ports, where v∈{1,2, ..., c} and where v may be a positive integer greater than or equal to one. In addition, c may be determined by choosing one or an even number from the sequence {1, ..., ρ} where c may be limited by ρ. For example, if the UE is equipped with four antenna ports (e.g., ρ is equal to four), the maximum number of c may be four (e.g., the maximum number of transmission layers may be four). In other words, the maximum number of transmission layers may be up to eight when the UE is equipped with eight antenna ports. The number of layers indicated for actual transmission (e.g., CB or NCB PUSCH transmission) may be limited to a number less than or equal to the maximum number of transmission layers.

In some implementations, when a gNB/NW sends the UECapabilityEnquiry message to a UE, the UE may report one or more than one the codebook subset support capabilities.

In some implementations, the UE may indicate its support for the codebook subset used for the full-coherent precoders by setting a specific field in an IE. For example, the field $N_g$ for indicating the number of antenna groups may be set to 1, where $N_g=1$ may represent that the UE has one antenna group.

In some implementations, the UE may indicate its support for the codebook subset used for the partial-coherent precoders with $N_g=2$ by setting a specific field in an IE. For example, the field $N_g$ may be set to 2, where $N_g=2$ may represent a UE with two antenna groups.

In some implementations, the UE may indicate its support for the codebook subset used for the partial-coherent precoders with $N_g=4$ by setting a specific field in an IE. For example, the field $N_g$ may be set to 4, where $N_g=4$ may represent a UE with four antenna groups.

In some implementations, the UE may indicate its support for the codebook subset used for the noncoherent precoders with $N_g=8$ by setting a specific field in an IE. For example, the field $N_g$ may be set to 8, where $N_g=8$ may represent a UE with eight antenna groups.

In some implementations, the UE may indicate its support for the codebook subset(s) used for at least one of the full-coherent precoders with $N_g=1$, the partial-coherent precoders with $N_g=2$, the partial-coherent precoders with $N_g=4$, and the noncoherent precoders with $N_g=8$ by setting a specific field in an IE. In other words, the UE may configure one or more than one $N_g$ via the specific field in the IE. For example, the specific field may be set by a 4-bit bitmap, where each bit is associated with a value of $N_g$. If a bit is set to 1, the UE may indicate its support for the codebook subset used for the precoders with the associated $N_g$ value. The rightmost bit of the bitmap may be the LSB, and the leftmost bit of the bitmap may be the MSB. In some implementations, the $N_g$ value may be associated with the bitmap in an increasing order. For instance, $N_g=1$ may be associated with the LSB of the bitmap, $N_g=2$ may be associated with the second rightmost bit of the bitmap, $N_g=4$ may be associated with the third rightmost bit of the bitmap, and $N_g=8$ may be associated with the MSB of the bitmap. As an example, when the bitmap is set to '1101', it may mean that the UE may support the codebook subsets used for the full-coherent precoders (corresponding to $N_g=1$), the partial-coherent precoders (corresponding to $N_g=4$), and the noncoherent precoders (corresponding to $N_g=8$). In some implementations, the $N_g$ value may be associated with the bitmap in a decreasing order. For instance, $N_g=8$ may be associated with the LSB of the bitmap, $N_g=4$ may be associated with the second rightmost bit of the bitmap, $N_g=2$ may be associated with the third rightmost bit of the bitmap, and $N_g=1$ may be associated with the MSB bit of the bitmap. For example, the bitmap '1101' may indicate that the UE may support the codebook subsets used for the full-coherent precoders with $N_g=1$, the partial-coherent precoders with $N_g=2$, and the noncoherent precoders with $N_g=8$.

In some implementations, the UE may indicate its support for the codebook subset(s) used for at least one of the full-coherent precoders with $N_g=1$, the partial-coherent precoders with $N_g=2$, the partial-coherent precoders with $N_g=4$, and the noncoherent precoders with $N_g=8$ by setting a specific field in an IE. In other words, the UE may configure one or more than one $N_g$ via the specific field in the IE. For example, the specific field may be set by an index, where the index may be associated with a combination of $N_g$ values. Moreover, the UE may set the specific field according to a dedicated table, where the dedicated table may include $2^4-1$ combinations. One of the combinations may include one, two, three, or four $N_g$ values. In some implementations, the combination including no $N_g$ value may be excluded.

In some implementations, the UE may indicate its support for the codebook subset(s) used for at least one of the full-coherent precoders with $N_g=1$, the partial-coherent precoders with $N_g=2$, the partial-coherent precoders with $N_g=4$, and the noncoherent precoders with $N_g=8$ by setting four specific fields in an IE. In other words, the UE may configure one or more than one $N_g$ via four specific fields in the IE, where each specific field may be associated with one $N_g$ value. Moreover, the four specific fields may be in an ENUMERATED format, such as ENUMERATED {enabled, disabled}. For example, if only the specific field associated with $N_g=1$ is set to 'enabled' and the other specific fields are set to 'disabled', the UE may indicate its support for the codebook subsets used for the full-coherent precoders. For example, if the specific field associated with $N_g=1$ and the specific field associated with $N_g=4$ are set to 'enabled' and the other specific fields are set to 'disabled', the UE may indicate its support the codebook subsets used for the full-coherent precoders and the partial-coherent precoders with $N_g=4$. For example, if all of the specific fields are set to 'enabled', the UE may indicate its support for the codebook subsets used for the full-coherent precoders with $N_g=1$, the partial-coherent precoders with $N_g=2$, the partial-coherent precoders with $N_g=4$, and the noncoherent precoders with $N_g=8$. In some implementations, the UE may support at least one of the $N_g$ values when the number of antenna ports used for transmission is eight.

In some implementations, the UE may indicate its support for the codebook subset used for precoders with the associated $N_g$ value by setting a specific field in an IE to '$N_g$' in the enumeration, where the $N_g$ value may be 1, 2, 4, or 8.

PUSCH Configuration

A UE may be configured with a PUSCH configuration when it receives an RRCSetup message, RRCResume message, RRCReconfiguration message, or another message sent by a gNB/NW via RRC signaling. These messages may include a PUSCH-Config IE, which may be related to the parameter settings used for the PUSCH transmission. The PUSCH-Config IE may include at least one of the following fields: txConfig, mcs-Table, mcs-TableTransformPrecoder, transformPrecoder, codebookSubset, codebookSubsetDCI-0-2, maxRank, maxRankDCI-0-2, mcs-TableDCI-0-2, and mcs-TableTransformPrecoderDCI-0-2.

The txConfig may indicate whether the UE uses the CB or NCB PUSCH transmission. For example, if the txConfig is set to codebook, the UE may use the CB PUSCH transmission; if the txConfig is set to noncodebook, the UE may use the NCB PUSCH transmission; if the txConfig is absent, the UE may transmit a PUSCH on one antenna port. The mcs-Table or mcs-TableTransformPrecoder may indicate which MCS table to use for the PUSCH transmission triggered by the DCI format 0_0 and DCI format 0_1, depending on whether the transform precoding is disabled or enabled. The mcs-Table-DCI-0-2-r16 or mcs-TableTransformPrecoder-DCI-0-2 may indicate which MCS table to use for the PUSCH transmission triggered by the DCI format 0_2, depending on whether the transform precoding is disabled or enabled. The maxRank or maxRankDCI-0-2 may indicate the maximum transmission rank for a PUSCH triggered by the DCI format 0_1 or DCI format 0_2. The codebookSubset or codebookSubsetDCI-0-2 may indicate the codebook subset(s) of TPMIs that may be used for the PUSCH triggered by the DCI format 0_1 or DCI format 0_2. The transformPrecoder may indicate whether the transform precoding is enabled or disabled. In some implementations, if the field transformPrecoder is absent, the UE may apply the value of the field msg3-transformPrecoder.

In some implementations, the UE may be configured with the maximum transmission rank of the PUSCH by the NW via RRC signaling, such as via the maxRank included in the PUSCH-Config IE. The value of the maxRank may be an integer selected between one and c. For example, the format of the maxRank may be INTEGER (0 . . . c) or INTEGER (1 . . . c). In some implementations, c may be less than or equal to the maxNumberMIMO-LayersCB-PUSCH or maxNumberMIMO-LayersNCB-PUSCH, depending on whether the txConfig is set to codebook or noncodebook. The UE may be a device with eight antenna ports.

In some implementations, the UE may identify the number of antenna ports used for transmission by RRC signaling from the gNB/NW (e.g., the PUSCH-Config IE, SRS-Config IE or other IE). The maximum number of antenna ports used for transmission may be limited by the UE capability. More specifically, the maximum number of antenna ports may be less than or equal to the value reported by the UE capability.

In some implementations, if the UE receives, from the gNB/NW, the PUSCH-Config IE including the field for a codebook subset configuration via RRC signaling, the UE may configure one coherence capability from the supported codebook subset(s) indicated by the UE itself. Moreover, each coherence capability may be associated with one supported codebook subset. For example, if the configured coherence capability is associated with $N_g=2$, the UE may be allowed to use one of the partial-coherent precoders with $N_g=2$ for PUSCH transmission. This may apply similarly for other $N_g$ values.

In some implementations, if the UE reports one, two, three, or four supported $N_g$ values to the gNB/NW, the UE may configure a coherence capability associated with one of these supported $N_g$ values by receiving the PUSCH-Config IE from the gNB/NW. For example, if the UE reports that it supports $N_g=1$, $N_g=2$, and $N_g=8$, the gNB/NW may configure one coherence capability associated with $N_g=1$, $N_g=2$, or $N_g=8$ for the UE via RRC signaling.

In some implementations, if the UE identifies that the number of antenna ports used for transmission is equal to eight and is configured to perform the CB transmission, the UE may configure only one coherence capability from the supported codebook subset(s) for itself based on the received PUSCH-Config IE; otherwise, the UE may configure its nested coherence capability to support a codebook subset based on the received PUSCH-Config IE. The UE may identify the number of antenna ports used for the CB transmission through the indicated SRS resource by receiving DCI or RRC signaling from the gNB/NW. For example, when the number of antenna ports used for the CB transmission is eight, the gNB/NW may configure the UE with one coherence capability from the supported codebook subset(s). For example, when the number of antenna ports used for the CB transmission is two or four, the gNB/NW may configure the UE with one nested coherence capability (e.g., fullyAndParialAndNonCoherent, parialAndNonCoherent, or nonCoherent) based on the supported codebook subset (e.g., fullCoherent, parialCoherent, or nonCoherent).

In some implementations, if the UE configures only one coherence capability from the supported codebook subset(s) for itself based on the received PUSCH-Config IE, the corresponding field in the received PUSCH-Config IE may be in an ENUMERATED format (e.g., ENUMERATED {n1, n2, n4, n8}). The coherence capability associated with $N_g=1$ may be configured when this field is set to n1. The coherence capability associated with $N_g=2$ may be configured when this field is set to n2. The coherence capability associated with $N_g=4$ may be configured when this field is set to n4. The coherence capability associated with $N_g=8$ may be configured when this field is set to n8.

In some implementations, if the UE configures only one coherence capability from the supported codebook subset(s) for itself based on the received PUSCH-Config IE, the corresponding field in the received PUSCH-Config IE may be in a BIT STRING format (e.g., a 4-bit bitmap). In some implementations, each bit may be associated with one value of $N_g$ and only one bit in the bitmap may be set to "1". For example, the bitmap '1000' may correspond to $N_g=8$; the bitmap '0100' may correspond to $N_g=4$; the bitmap '0010' may correspond to $N_g=2$; and the bitmap '0001' may correspond to $N_g=1$.

In some implementations, if the UE configures only one coherence capability from the supported codebook subset(s) for itself based on the received PUSCH-Config IE, the corresponding field in received PUSCH-Config IE may be in a BIT STRING format, where each coherence capability may be represented by one codepoint. In some implementations, the codepoint '00' may correspond to $N_g=1$, the codepoint '01' may correspond to $N_g=2$, the codepoint '10' may correspond to $N_g=4$, and the codepoint '11' may correspond to $N_g=8$. In some implementations, the codepoint '11' may correspond to $N_g=1$, the codepoint '10' may correspond to $N_g=2$, the codepoint '01' may correspond to $N_g=4$, and the codepoint '00' may correspond to $N_g=8$.

In some implementations, if the UE configures only one coherence capability from the supported codebook subset(s) for itself based on the received PUSCH-Config IE, the corresponding field in the received PUSCH-Config IE may be in an ENUMERATED format. For example, the field may be represented by ENUMERATED {n1, n2, n4, n8}. When the field is set to 'n1'/'n2'/'n4'/'n8', it corresponds to $N_g=1/2/4/8$.

In some implementations, when the gNB/NW sends the UJECapabilityEnquiry message to the UE, the UE may respond by sending the (JECapabilityInformation message, which may indicate the maximum number of codewords. The UE may report the maximum number of codewords by sending a (JECapabilityInformation message. For example, the UECapabilityInformation message may include a single field within the FeatureSetUplinkPerCC IE, the MIMO)-ParametersPerBand IE, or another IE) to the gNB/NW. For example, the UE may set this field to one of two possible settings: n1 or n2. This field may be in an ENUMERATED format, such as ENUMERATED {n1, n2}. When the UE configures this field to n1, the UE may only support/perform a single-codeword transmission. When the UE configures this field to n2, the UE may support both single-codeword transmission and dual-codeword transmission.

In some implementations, if this field is set to n1, a single codeword may be mapped to all transmission layers for the CB/NCB PUSCH. In some implementations, if this field is set to n2, the number of enabled codewords may be determined by the number of transmission layers. For example, if the number of transmission layers configured by the gNB/NW is less than or equal to four, only a single codeword may be enabled; otherwise, two codewords may be enabled.

In some implementations, if this field is set to n2 and only a single-codeword is enabled, a single codeword may be mapped to all transmission layers for the CB/NCB PUSCH. Moreover, the single codeword may be mapped to at most eight layers.

In some implementations, if this field is set to n2 and dual-codeword are enabled, each codeword may be mapped to a corresponding transmission layer group for the CB/NCB PUSCH. Moreover, each codeword may be mapped to at most four layers.

Layer Mapping

Layer mapping may represent a procedure that maps complex-valued modulation symbols for each codeword to the transmission layers. For a PUSCH transmission, the gNB/NW may indicate/configure the number of transmission layers and the number of enabled codewords to the UE via DCI/RRC signaling. Furthermore, these two values may be related to measurements from a reference signal (e.g., the SRS) transmitted by the UE.

Based on these indicated/configured two values (e.g., the number of transmission layers and the number of enabled codewords) (e.g., by the gNB/NW), the UE may use a dedicated table to map the complex-value symbols to the transmission layers. In the present disclosure, $M_{symb}^{layer}$ denotes the number of modulation symbols to transmit per layer for a physical channel and $M_{symb}^{(q)}$ represents the number of modulation symbols to transmit on a physical channel for codeword q where $q \in \{0,1\}$. $d^{(q)}(i)$ represents the complex-valued modulation symbol corresponding to the index i for codeword q where $i=0, \ldots, M_{symb}^{(q)}-1$. In addition, $x(i)=[x^{(0)}(i) \ldots x^{(v)}(i)]^T$ is the vector corresponding to mapped layers where $i=0, \ldots, M_{symb}^{layer}-1$ and v is the number of layers.

Table 1 illustrates an example layer mapping, according to an example implementation of the present disclosure. In some implementations, if the UE is indicated/configured with the number of transmission layers as one of {1, 2, 3, 4, 5, 6, 7, 8}, the dual-codeword is enabled, and only a single codeword is performed, the UE may map the complex-valued modulation symbols to the transmission layers according to Table 1 below.

TABLE 1

| Number of layers | Number of codewords | Codeword-to-layer mapping $i = 0, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = \frac{M_{symb}^{(0)}}{2}$ |

TABLE 1-continued

| Number of layers | Number of codewords | Codeword-to-layer mapping $i = 0, \ldots, M_{symb}^{layer} - 1$ | |
|---|---|---|---|
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = \frac{M_{symb}^{(0)}}{3}$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = \frac{M_{symb}^{(0)}}{4}$ |
| 5 | 1 | $x^{(0)}(i) = d^{(0)}(5i)$ $x^{(1)}(i) = d^{(0)}(5i +1)$ $x^{(2)}(i) = d^{(0)}(5i +2)$ $x^{(3)}(i) = d^{(0)}(5i + 3)$ $x^{(4)}(i) = d^{(0)}(5i + 4)$ | $M_{symb}^{layer} = \frac{M_{symb}^{(0)}}{5}$ |
| 6 | 1 | $x^{(0)}(i) = d^{(0)}(6i)$ $x^{(1)}(i) = d^{(0)}(6i + 1)$ $x^{(2)}(i) = d^{(0)}(6i + 2)$ $x^{(3)}(i) = d^{(0)}(6i + 3)$ $x^{(4)}(i) = d^{(0)}(6i + 4)$ $x^{(5)}(i) = d^{(0)}(6i + 5)$ | $M_{symb}^{layer} = \frac{M_{symb}^{(0)}}{6}$ |
| 7 | 1 | $x^{(0)}(i) = d^{(0)}(7i)$ $x^{(1)}(i) = d^{(0)}(7i + 1)$ $x^{(2)}(i) = d^{(0)}(7i + 2)$ $x^{(3)}(i) = d^{(0)}(7i + 3)$ $x^{(4)}(i) = d^{(0)}(7i + 4)$ $x^{(5)}(i) = d^{(0)}(7i + 5)$ $x^{(6)}(i) = d^{(0)}(7i + 6)$ | $M_{symb}^{layer} = \frac{M_{symb}^{(0)}}{7}$ |
| 8 | 1 | $x^{(0)}(i) = d^{(0)}(8i)$ $x^{(1)}(i) = d^{(0)}(8i + 1)$ $x^{(2)}(i) = d^{(0)}(8i + 2)$ $x^{(3)}(i) = d^{(0)}(8i + 3)$ $x^{(4)}(i) = d^{(0)}(8i + 4)$ $x^{(5)}(i) = d^{(0)}(8i + 5)$ $x^{(6)}(i) = d^{(0)}(8i + 6)$ $x^{(7)}(i) = d^{(0)}(8i + 7)$ | $M_{symb}^{layer} = \frac{M_{symb}^{(0)}}{8}$ |

Table 2 illustrates an example layer mapping according to an example implementation of the present disclosure. In some implementations, if the UE is indicated/configured with the number of transmission layers as one of {1, 2, 3, 4, 5, 6, 7, 8} and two codewords are enabled when the indicated/configured number of layers is greater than four, the UE may map the complex-valued modulation symbols to the transmission layers according to Table 2 below.

TABLE 2

| Number of layers | Number of codewords | Codeword-to-layer mapping $i = 0, \cdots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = \frac{M_{symb}^{(0)}}{2}$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = \frac{M_{symb}^{(0)}}{3}$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = \frac{M_{symb}^{(0)}}{4}$ |
| 5 | 2 | $x^{(0)}(i) = d^{(0)}(2i)$ $x^{(1)}(i) = d^{(0)}(2i+1)$ $x^{(2)}(i) = d^{(1)}(3i)$ | $M_{symb}^{layer} = \frac{M_{symb}^{(0)}}{2} = \frac{M_{symb}^{(1)}}{3}$ |

TABLE 2-continued

| Number of layers | Number of codewords | Codeword-to-layer mapping $i = 0, \cdots, M_{symb}^{layer} - 1$ | | |
|---|---|---|---|---|
| | | $x^{(3)}(i) = d^{(1)}(3i + 1)$ $x^{(4)}(i) = d^{(1)}(3i + 2)$ | | |
| 6 | 2 | $x^{(0)}(i) = d^{(0)}(3i)$ $x^{(1)}(i) = d^{(0)}(3i + 1)$ | $M_{symb}^{layer} = \frac{M_{symb}^{(0)}}{3} = \frac{M_{symb}^{(1)}}{3}$ | |
| | | $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | | |
| 7 | 2 | $x^{(0)}(i) = d^{(0)}(3i)$ $x^{(1)}(i) = d^{(0)}(3i + 1)$ | $M_{symb}^{layer} = \frac{M_{symb}^{(0)}}{3} = \frac{M_{symb}^{(1)}}{4}$ | |
| | | $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | | |
| 8 | 2 | $x^{(0)}(i) = d^{(0)}(4i)$ $x^{(1)}(i) = d^{(0)}(4i + 1)$ | $M_{symb}^{layer} = \frac{M_{symb}^{(0)}}{4} = \frac{M_{symb}^{(1)}}{4}$ | |
| | | $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | | |

Table 3 illustrates an example layer mapping according to an example implementation of the present disclosure. In some implementations, if the UE is indicated/configured with the number of transmission layers as one of {1, 2, 3, 4, 5, 6, 7, 8} and two codewords are enabled when the indicated/configured number of layers is greater than four, the UE may map the complex-valued modulation symbols to the transmission layers according to Table 3 below.

TABLE 3

| Number of layers | Number of codewords | Codeword-to-layer mapping $i = 0, \ldots, M_{symb}^{layer} - 1$ | | |
|---|---|---|---|---|
| 1 | 1 | $x^{(0)}(i) = d^{(0)}(i)$ | $M_{symb}^{layer} = M_{symb}^{(0)}$ | |
| 2 | 1 | $x^{(0)}(i) = d^{(0)}(2i)$ $x^{(1)}(i) = d^{(0)}(2i + 1)$ | $M_{symb}^{layer} = \frac{M_{symb}^{(0)}}{2}$ | |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = \frac{M_{symb}^{(0)}}{3}$ | |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = \frac{M_{symb}^{(0)}}{4}$ | |
| 5 | 2 | $x^{(0)}(i) = d^{(0)}(3i)$ $x^{(1)}(i) = d^{(0)}(3i + 1)$ | $M_{symb}^{layer} = \frac{M_{symb}^{(0)}}{3} = \frac{M_{symb}^{(1)}}{2}$ | |
| | | $x^{(2)}(i) = d^{(0)}(3i + 2)$ $x^{(3)}(i) = d^{(1)}(2i)$ $x^{(4)}(i) = d^{(1)}(2i + 1)$ | | |
| 6 | 2 | $x^{(0)}(i) = d^{(0)}(3i)$ $x^{(1)}(i) = d^{(0)}(3i + 1)$ | $M_{symb}^{layer} = \frac{M_{symb}^{(0)}}{3} = \frac{M_{symb}^{(1)}}{3}$ | |
| | | $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | | |
| 7 | 2 | $x^{(0)}(i) = d^{(0)}(4i)$ $x^{(1)}(i) = d^{(0)}(4i + 1)$ | $M_{symb}^{layer} = \frac{M_{symb}^{(0)}}{4} = \frac{M_{symb}^{(1)}}{3}$ | |
| | | $x^{(2)}(i) = d^{(0)}(4i + 2)$ $x^{(3)}(i) = d^{(0)}(4i + 3)$ $x^{(4)}(i) = d^{(1)}(3i)$ $x^{(5)}(i) = d^{(1)}(3i + 1)$ $x^{(6)}(i) = d^{(1)}(3i + 2)$ | | |
| 8 | 2 | $x^{(0)}(i) = d^{(0)}(4i)$ $x^{(1)}(i) = d^{(0)}(4i + 1)$ | $M_{symb}^{layer} = \frac{M_{symb}^{(0)}}{4} = \frac{M_{symb}^{(1)}}{4}$ | |
| | | $x^{(2)}(i) = d^{(0)}(4i + 2)$ $x^{(3)}(i) = d^{(0)}(4i + 3)$ $x^{(4)}(i) = d^{(1)}(4i)$ $x^{(5)}(i) = d^{(1)}(4i + 1)$ $x^{(6)}(i) = d^{(1)}(4i + 2)$ $x^{(7)}(i) = d^{(1)}(4i + 3)$ | | |

Antenna Port Mapping

Antenna port mapping may represent the procedure that maps the transmission layers to the antenna ports. For a UL transmission, the UE may configure its transmission precoding matrix by receiving DCI/RRC signaling from the gNB/NW to perform antenna port mapping. The layer vector x(i) may be transformed into the transmission layer vector $y(i)=[y^{(0)}(i) \ldots y^{(v-1)}(i)]^T$ when transform precoding is enabled, otherwise y(i)=x(i). $z(i)=[z^{(p_0)}(i) \ldots z^{(p_{\rho-1})}(i)]^T$ represents the complex-valued vector mapped from y (i) through the transmission precoding matrix, where the antenna ports start from $p_0$ to $p_{\rho-1}$. W represents the transmission precoding matrix and the relationship between z(i) and y(i) may be described by the formula below:

$$\begin{bmatrix} z^{(p_0)}(i) \\ \vdots \\ z^{(p_{\rho-1})}(i) \end{bmatrix} = W \begin{bmatrix} y^{(0)}(i) \\ \vdots \\ y^{(v-1)}(i) \end{bmatrix}$$

In some implementations, if the gNB/NW configures the UE with the coherence capability associated with $N_g=1$ by sending RRC signaling, MAC CE, or DCI signaling to the UE, the transmission precoding matrix may be selected by the UE from the codebook subset containing fully coherent precoding matrices.

In some implementations, the codebook used for the coherence capability associated with $N_g=1$ may be generated according to the principle of the DL Type I codebook. Based on this principle, the gNB/NW may inform the UE of wideband information (e.g., $i_{1,x}$) and subband information $i_2$ via DCI signaling, MAC CE, or RRC signaling. Furthermore, the number of indexes corresponding to the wideband information may depend on the number of antenna ports used for UL transmission and layout configuration of antenna ports (e.g., $(N_1, N_2)$). For example, the gNB/NW may configure the UE with one full-coherent precoder by informing one combination of wideband information and subband information via DCI signaling, MAC CE, or RRC signaling.

In some implementations, a combination of wideband information and subband information, sent by the gNB/NW to the UE, may be represented by an index. In other words, the gNB/NW may inform the UE of the wideband information and the subband information via DCI signaling, MAC CE, or RRC signaling including the corresponding index. For example, the gNB/NW may configure the UE with an index associated with n-tuple including the wideband information and the subband information, where the n-tuple includes $i_{1,x}$ and $i_2$, for indicating a full-coherent precoder via DCI signaling, MAC CE, or RRC signaling.

In some implementations, the UE may get the wideband information by receiving common signaling (e.g., DCI signaling, MAC CE, or RRC signaling) sent by the gNB/NW, where the common signaling may be used to notify a group of UEs. In other words, the gNB/NW may send the common signaling to a group of UEs, so all the UEs in the group may get the same wideband information. The common signaling may refer to a common configuration, a DCI format with CRC scrambled by a specific RNTI, or a specific DCI format.

In some implementations, the UE may get the subband information by receiving dedicated signaling (e.g., DCI signaling, MAC CE, or RRC signaling) sent by the gNB/NW, where the dedicated signaling may be used to notify a specific UE. In other words, the gNB/NW may send the dedicated signaling to the specific UE, so the specific UE may get the dedicated subband information.

In some implementations, if the gNB/NW configures the UE with the coherence capability associated with $N_g=2$ via RRC signaling, MAC CE, or DCI signaling, the transmission precoding matrix may be selected from the codebook subset that includes partially coherent precoding matrices, and the UE may support two antenna groups.

In some implementations, the codebook used for the coherence capability associated with $N_g=2$ may be replaced by two 4TX codebooks. These two 4TX codebooks may only include fully coherent precoding matrices used for the UE with four antenna ports. In other words, the transmission matrix may consist of two fully coherent precoding matrices. These two precoding matrices may be selected from the same or different 4TX codebooks.

In some implementations, the information regarding the transmission precoding matrix, transmitted by the gNB/NW through DCI signaling, may include two TPMIs. These two TPMIs may be selected from either the same or different 4TX codebooks.

In some implementations, when the information regarding the transmission precoding matrix includes two TPMIs, the corresponding field/parameter may represent this information by concatenating the two TPMIs. For example, the corresponding field in the dedicated DCI format may represent the first TPMI by the first X bits and the second TPMI by the remaining Y bits. For example, in the dedicated IE received through the RRC signaling, the corresponding parameter may be expressed as a value. The first M digits of this value may correspond to the first TPMI, while the remaining N digits may correspond to the second TPMI. Moreover, X may be equal to or different from Y, depending on the dedicated tables used for the 4TX codebooks. Similarly, M may be equal to or different from N.

In some implementations, a combination of two TPMIs, sent by the gNB/NW to the UE, may be represented by an index. In other words, the gNB/NW may inform the UE of two TPMIs via DCI signaling, MAC CE, or RRC signaling including the corresponding index. For example, the UE may receive the corresponding index from DCI signaling, MAC CE, or RRC signaling. By looking up the dedicated table using this index, the UE may determine two TPMIs.

In some implementations, a combination of two TPMIs, sent by the gNB/NW to the UE, may be represented by an index. In other words, the gNB/NW may inform the UE of two TPMIs via DCI signaling, MAC CE, or RRC signaling. In some implementations, the RRC signaling may include the first part information of the corresponding index and the DCI signaling or MAC CE may include the residual information of the corresponding index. For example, the gNB/NW may configure the UE with the first part of the corresponding index via RRC signaling and then inform the UE of the remaining information of the corresponding index via DCI signaling or MAC CE. By looking up the dedicated table using this index, the UE may determine two TPMIs.

Table 4 illustrates combinations of layer splitting across 2 antenna groups according to an example implementation of the present disclosure. In some implementations, when the UE configures the coherence capability associated with $N_g=2$ itself by receiving RRC signaling, MAC CE, or DCI signaling from the gNB/NW, the combinations of layer splitting may follow Table 4 below.

TABLE 4

| Rank | All layers in one Antenna Group | Layers split across 2 Antenna Groups |
|---|---|---|
| 1 | (1, 0), (0, 1) | |
| 2 | (2, 0), (0, 2) | |
| 2 | | (1, 1) |
| 3 | (3, 0), (0, 3) | |
| 3 | | (1, 2), (2, 1) |
| 4 | (4, 0), (0, 4) | |
| 4 | | (2, 2) |
| 5 | | (2, 3), (3, 2) |
| 6 | | (3, 3) |
| 7 | | (3, 4), (4, 3) |
| 8 | | (4, 4) |

In Table 4, the first number in a pair may represent the number of transmission layers assigned to the first antenna group, while the second number in the pair may represent the number of transmission layers assigned to the second antenna group. Some combinations may be excluded if their benefits to system performance are not evident.

In some implementations, when the transmission rank is equal to 1/2/3/4 and only one antenna group is used for transmission, the UE may configure a TPMI with 1/2/3/4 layer(s) for either the first antenna group or the second antenna group, according to the received RRC signaling, MAC CE, or DCI signaling received from the gNB/NW. When the information pertaining to the transmission precoding matrix is expressed through concatenation of two TPMIs, zero padding may be performed for the TPMI associated with zero transmission layer. When the information pertaining to the transmission precoding matrix is expressed through the index representing the combination of two TPMIs, the combination may include pairs with only one TPMI.

In some implementations, if the transmission rank is more than two, the transmission layers of a single codeword may be transmitted by the same or different antenna groups. For example, considering the transmission layer vector as $y(i)=[y^{(0)}(i) \ldots y^{(4)}(i)]^T$, the elements from $y^{(0)}(i)$ to $y^{(2)}(i)$ may belong to the first codeword. Additionally, the first TPMI corresponding to the first antenna group may include two transmission layers from the first two layers of the first codeword, while the second TPMI corresponding to the second antenna group may include three transmission layers including the third layer of the first codeword and the two layers of the second codeword. The first two layers of the first codeword may be transmitted through the first antenna group, while the third layer of the first codeword may be transmitted through the second antenna group.

In some implementations, if the transmission rank is more than two, the transmission layers of each codeword may be transmitted by a single antenna group. For example, considering the transmission layer vector as $y(i)=[y^{(0)}(i) \ldots y^{(4)}(i)]^T$, the elements from $y^{(0)}(i)$ to $y^{(1)}(i)$ may belong to the first codeword. Additionally, the first TPMI corresponding to the first antenna group may include two transmission layers from the first codeword, while the second TPMI corresponding to the second antenna group may include three transmission layers from the second codeword. All layers of the first codeword may be transmitted through the first antenna group, while all layers of the second codeword may be transmitted through the second antenna group.

In some implementations, if the UE is configured with the coherence capability associated with $N_g=4$ (e.g., by receiving RRC signaling, MAC CE, or DCI signaling from the gNB/NW), the transmission precoding matrix may be selected from the codebook subset that includes partially coherent precoding matrices, and the UE may support four antenna groups.

In some implementations, the codebook used for the coherence capability associated with $N_g=4$ may be replaced by four 2TX codebooks. These four 2TX codebooks may only include fully coherent precoding matrices used for the UE with two antenna ports. In other words, the transmission matrix may consist of four fully coherent precoding matrices, each selected from the same or different 2TX codebooks.

In some implementations, the information regarding the transmission precoding matrix, transmitted by the gNB/NW through DCI signaling, may include four TPMIs. These four TPMIs may be selected from either the same or different 2TX codebooks.

In some implementations, when the information regarding the transmission precoding matrix includes four TPMIs, the corresponding field/parameter may represent this information by concatenating these four TPMIs. For example, the corresponding field in the dedicated DCI format may represent the first TPMI by the first X bits, the second TPMI by Y bits after the X bits, the third TPMI by Z bits after the X+Y bits, and the fourth TPMI by the remaining/bits. For example, in the dedicated IE received through the RRC signaling, the corresponding parameter may be expressed as a value. The first M digits of this value may correspond to the first TPMI, the N digits after the M digits of this value may correspond to the second TPMI, the O digits after the M+N digits of this value may correspond to the third TPMI, and the remaining K digits of this value may correspond to the fourth TPMI. Moreover, the values of X, Y, Z, and L may vary depending on the lookup in the 2TX codebooks. Similarly, the values of M, N, O, and K may also vary.

In some implementations, a combination of four TPMIs, sent by the gNB/NW to the UE, may be represented by an index. In other words, the gNB/NW may inform the UE of four TPMIs via DCI signaling, MAC CE, or RRC signaling including the corresponding index. For example, the UE may receive the corresponding index via DCI signaling, MAC CE, or RRC signaling. By looking up the dedicated table using this index, the UE may determine four TPMIs.

Table 5 illustrates combinations of layer splitting across 4 antenna groups according to an example implementation of the present disclosure. In some implementations, when the UE configures the coherence capability associated with $N_g=4$ itself by receiving RRC signaling, MAC CE, or DCI signaling from the gNB/NW, the combinations of layer splitting may follow Table 5 below.

TABLE 5

| Rank | All layers in one Antenna Group | Layers split across 4 Antenna Groups |
|---|---|---|
| 1 | (1, 0, 0, 0), (0, 1, 0, 0), (0, 0, 1, 0), (0, 0, 0, 1) | |
| 2 | (2, 0, 0, 0), (0, 2, 0, 0), (0, 0, 2, 0), (0, 0, 0, 2) | |
| 2 | | (1, 1, 0, 0), (1, 0, 1, 0), (1, 0, 0, 1), (0, 1, 1, 0), (0, 0, 1, 1) |
| 3 | | (2, 1, 0, 0), (2, 0, 1, 0), (2, 0, 0, 1), (0, 2, 1, 0), (0, 2, 0, 1), (0, 0, 2, 1), (1, 1, 1, 0), (1, 1, 0, 1), (1, 0, 1, 1), (0, 1, 1, 1) |
| 4 | | (1, 1, 1, 1), (2, 0, 1, 1), (2, 1, 0, 1), (2, 1, 1, 0), (0, 2, 1, 1), (1, 2, 0, 1), (1, 2, 1, 0), (0, 1, 2, 1), (1, 0, 2, 1), (1, 1, 2, 0) |
| 5 | | (2, 0, 2, 1), (0, 2, 2, 1), (1, 1, 2, 1) |
| 6 | | (2, 2, 2, 0), (2, 0, 2, 2), (2, 1, 2, 1) |
| 7 | | (2, 1, 2, 2) |
| 8 | | (2, 2, 2, 2) |

In Table 5, the first, second, third, and fourth elements in the 4-tuple may represent the number of transmission layers assigned to the first, second, third, and fourth antenna groups, respectively. Some combinations may be excluded if their benefits to system performance are not evident.

In some implementations, when the transmission rank is equal to 1/2 and only one antenna group is used for transmission, the UE may configure a TPMI with 1/2 layers for one of the four antenna groups according to the received RRC signaling, MAC CE or DCI signaling from the gNB/NW. When the information pertaining to the transmission precoding matrix is expressed through concatenation of four TPMIs, zero padding may be performed for the TPMI associated with zero transmission layer. When the information pertaining to the transmission precoding matrix is expressed through the index representing the combination of four TPMIs, the combination may include a 4-tuple with only one TPMI.

In some implementations, if the transmission rank is more than two, the transmission layers of a single codeword may be transmitted by the same or different antenna groups. For example, considering the transmission layer vector as $y(i)=[y^{(0)}(i) \ldots y^{(4)}(i)]^T$, the elements from $y^{(0)}(i)$ to $y^{(2)}(i)$ may belong to the first codeword. Additionally, the first TPMI corresponding to the first antenna group may include two transmission layers from the first two layers of the first codeword, while the third TPMI corresponding to the third antenna group may include two transmission layers including the third layer of the first codeword and the first layer of the second word. The first two layers of the first codeword may be transmitted through the first antenna group, while the third layer of the first codeword may be transmitted through the third antenna group.

In some implementations, if the transmission rank is more than two, the transmission layers of each codeword may be transmitted by a single antenna group. Furthermore, the maximum number of transmission rank may be equal to four when two codewords is enabled. For example, considering the transmission layer vector as $y(i)=[y^{(0)}(i) \ldots y^{(3)}(i)]^T$, the elements from $y^{(0)}(i)$ to $y^{(1)}(i)$ may belong to the first codeword. Additionally, the first TPMI corresponding to the first antenna group may include two transmission layers from the first codeword, while the third TPMI corresponding to the third antenna group may include two transmission layers from the second codeword. All layers of the first codeword may be transmitted through the first antenna group, while all layers of the second codeword may be transmitted through the third antenna group.

In some implementations, if the UE is configured with the coherence capability associated with $N_g=8$ (e.g., by receiving RRC signaling, MAC CE, or DCI signaling from the gNB/NW), the transmission precoding matrix may be selected from the codebook subset that includes noncoherent precoding matrices.

In some implementations, the codebook may include only noncoherent precoders where all precoders may include 8 rank-1 precoders and a scaling factor. The scaling factor may be represented by a. The 8 rank-1 precoders may be expressed as $$\begin{bmatrix}1\\0\\0\\0\\0\\0\\0\\0\end{bmatrix}, \begin{bmatrix}0\\1\\0\\0\\0\\0\\0\\0\end{bmatrix}, \begin{bmatrix}0\\0\\1\\0\\0\\0\\0\\0\end{bmatrix}, \begin{bmatrix}0\\0\\0\\1\\0\\0\\0\\0\end{bmatrix}, \begin{bmatrix}0\\0\\0\\0\\1\\0\\0\\0\end{bmatrix}, \begin{bmatrix}0\\0\\0\\0\\0\\1\\0\\0\end{bmatrix}, \begin{bmatrix}0\\0\\0\\0\\0\\0\\1\\0\end{bmatrix}, \begin{bmatrix}0\\0\\0\\0\\0\\0\\0\\1\end{bmatrix}$$

In some implementations, the 8 rank-1 precoders may generate $2^8-1$ noncoherent precoding matrices and all these precoding matrices may be included in the codebook. Each noncoherent precoding matrix may be associated with one index (e.g., a TPMI).

In some implementations, the dedicated codebook table may depend on the configured transform precoding, the configured maximum number of transmission rank, the configured full power mode, the configured coherence capability (e.g., the parameter codebookSubset), and the number of antenna ports used for PUSCH transmission for the UE.
Codebook Subset Switching The gNB/NW may indicate the precoding matrix used for PUSCH transmission to the UE based on the measurement result for the SRS. Furthermore, the optimal precoding matrix used for PUSCH transmission may vary according to channel conditions. The selected precoding matrix used for the PUSCH transmission may be chosen from the codebook configured for the UE by the gNB/NW, where the candidate precoding matrices in the configured codebook need to satisfy the configured coherence capability (e.g., the parameter code bookSubset). Additionally, the UE may (only) be configured with one coherence capability (e.g., $N_g \in \{1,2,4,8\}$) by receiving RRC signaling sent by the gNB/NW. In other words, the candidate precoding matrix of the configured codebook may (only) be changed through RRC signaling sent by the gNB/NW. To improve system performance, more flexibility in choosing the precoding matrix may be necessary. More precisely, the configured coherence capability for the UE may be changed dynamically via signaling other than the RRC signaling.

In some implementations, the UE may update the configured coherence capability by receiving MAC CE sent by the gNB/NW where the updated coherence capability may be one of the supported codebook subsets reported by the UE. For example, if the UE reports that it supports $N_g=1$, $N_g=2$ and $N_g=8$ to the gNB/NW and the UE is configured with the coherence capability $N_g=2$ by receiving RRC signaling sent by the gNB/NW, the gNB/NW may update the coherence capability from $N_g=2$ to $N_g=1$ via sending the MAC CE to the UE. The MAC CE may be a dedicated MAC CE used to update the configured coherence capability $N_g$. Moreover, the dedicated MAC CE may include at least a dedicated header (e.g., LCID) used to help the UE to identify the type of the MAC CE, a serving cell ID, a BWP ID, and four fields indicating four coherence capabilities. If one of the four fields is set to '1', the coherence capability may be updated to the corresponding coherence capability associated with the field set to '1'.

In some implementations, the UE may update the configured coherence capability by receiving DCI signaling sent by the gNB/NW where the updated coherence capability may be one of the supported codebook subsets reported by the UE. For example, if the UE reports that it supports $N_g=1$, and $N_g=2$ and $N_g=8$ to the gNB/NW and the UE is configured with the coherence capability $N_g=2$ by receiving RRC signaling sent by the gNB/NW, the gNB/NW may update the coherence capability from $N_g=2$ to $N_g=1$ via sending a DCI format to the UE. For example, the DCI format may include a field representing the updated coherence capability as a codepoint. The coherence capability $N_g=1/N_g=2/N_g=4/N_g=8$ may be represented by the codepoint '00'/'01'/'10'/'11'.

FIG. 1 is a flowchart illustrating a method/process 100 performed by a UE for codebook-based PUSCH transmission, according to an example implementation of the present disclosure.

In action 102, the process 100 may start by receiving, from a BS, an RRC message including a PUSCH configuration. The PUSCH configuration may indicate a codebook-based PUSCH transmission. For example, the PUSCH configuration may include a PUSCH-Config IE. The PUSCH-Config IE may include a field txConfig set to the codebook. The txConfig may be set to the codebook to indicate a CB PUSCH transmission or may be set to a noncodebook to indicate an NCB PUSCH transmission.

In action 104, the process 100 may receive, from the BS, a DCI format including a first field and a second field. The first field may indicate an 8-port SRS resource. In some implementations, the first field may include an SRS Resource Indicator (SRI). The second field may indicate an index that is associated with a TPMI and a number of transmission layers. The DCI format may schedule the codebook-based PUSCH transmission.

In action 106, the process 100 may determine a number of codewords to be one in a case that the number of transmission layers is less than or equal to four. In action 108, the process 100 may determine the number of codewords to be two in a case that the number of transmission layers is greater than four. For example, the number of codewords used for the layer mapping may be one if the number of transmission layers indicated in the DCI format is one of {1, 2, 3, 4}, and the number of codewords used for the layer mapping may be two if the number of transmission layers indicated in the DCI format is one of {5, 6, 7, 8}.

In action 110, the process 100 may determine a codeword-to-layer mapping for spatial multiplexing based on the number of transmission layers and the number of codewords. The codeword-to-layer mapping may represent a procedure that maps complex-valued modulation symbols, for each codeword, to the transmission layers.

In some implementations, in the case that the number of transmission layers is less than or equal to four, a first codeword may be used for the codeword-to-layer mapping for the spatial multiplexing. Complex-valued modulation symbols belonging to the first codeword may be mapped to the transmission layers in sequence. An example layer mapping is shown in Table 2.

In some implementations, in the case that the number of transmission layers is greater than four: a first codeword and a second codeword may be used for the codeword-to-layer mapping for spatial multiplexing. In a case that the number of transmission layers is five, complex-valued modulation symbols belonging to the first codeword may be mapped to first two transmission layers in sequence and complex-valued modulation symbols belonging to the second codeword may be mapped to third to fifth transmission layers in sequence. In a case that the number of transmission layers is six, complex-valued modulation symbols belonging to the first codeword may be mapped to first three transmission layers in sequence and complex-valued modulation symbols belonging to the second codeword may be mapped to fourth to sixth transmission layers in sequence. In a case that the number of transmission layers is seven, complex-valued modulation symbols belonging to the first codeword may be mapped to first three transmission layers in sequence and complex-valued modulation symbols belonging to the second codeword may be mapped to fourth to seventh transmission layers in sequence. In a case that the number of transmission layers is eight, complex-valued modulation symbols belonging to the first codeword may be mapped to first four transmission layers in sequence and complex-valued modulation symbols belonging to the second codeword may be mapped to fifth to eighth transmission layers in sequence. An example layer mapping is shown in Table 2.

In action 112, the process 100 may determine a precoding matrix based on the index and the codeword-to-layer mapping for the spatial multiplexing.

In some implementations, the PUSCH configuration may further indicate a maximum transmission rank (e.g., the maxRank or maxRankDCI-0-2), a transform precoding configuration, and a codebook subset configuration (e.g., the codebookSubset or codebookSubsetDCI-0-2). Determining the precoding matrix in action 112 may include determining a dedicated table based on the maximum transmission rank, the transform precoding configuration, and the codebook subset configuration; and determining the precoding matrix based on the dedicated table and the index. For example, the dedicated table may include two columns for each value of the maximum transmission rank. The first column of the dedicated table may correspond to the index, and the second column of the dedicated table may correspond to a combination of the number of transmission layers and the TPMI.

In action 114, the process 100 may perform the codebook-based PUSCH transmission using the precoding matrix. The process 100 may then end.

In some implementations, the maximum transmission rank may be one of 1, 2, 4, and 8.

In some implementations, the codebook subset configuration may indicate the number of antenna groups (e.g., $N_g$). Transmission antenna ports that belong to the same antenna group may be regarded as coherent. The number of antenna groups (e.g., $N_g$) may be one of 1, 2, 4, and 8.

In some implementations, in a case that the number of antenna groups (e.g., $N_g$) is 2 or 4: the index may correspond to multiple sub-indices. The sub-indices may be grouped into multiple pairs sequentially. The number of pairs may be equal to the number of antenna groups. Each pair may correspond to a sub-precoding matrix that is applied to each antenna group. For example, when $N_g=4$, the index may correspond to sub-indices $i_0$, $i_1$, $i_2$, ... $i_7$, which may be grouped sequentially in four pairs $\{i_0, i_1\}$, $\{i_2, i_3\}$, $\{i_4, i_5\}$, and $\{i_6, i_7\}$. Each pair may correspond to a sub-precoding matrix applied to one of the four antenna groups.

In some implementations, the pairs may include a first pair and a second pair. Each of the first and second pairs may include a first sub-index and a second sub-index. The first sub-index (e.g., $i_0$, $i_2$, $i_4$, $i_6$) may correspond to the number of transmission layers. The second sub-index (e.g., $i_1$, $i_3$, $i_5$, $i_7$) may correspond to a sub-TPMI. The first sub-index of the first pair may be different from the first sub-index of the second pair. For example, among the four pairs $\{i_0, i_1\}$, $\{i_2, i_3\}$, $\{i_4, i_5\}$, and $\{i_6, i_7\}$, there may be two pairs having a different first sub-index. For example, $i_0 \neq i_2$, $i_0 \neq i_4$, or $i_2 \neq i_6$ As such, the first pair and the second pair may correspond to different numbers of transmission layers.

The steps/actions shown in FIG. 1 should not be construed as necessarily order dependent. The order in which the process is described is not intended to be construed as a limitation. Moreover, some of the actions in FIG. 1 may be omitted in some implementations.

The technical problem addressed by the method illustrated in FIG. 1 is how to efficiently perform codebook-based PUSCH transmission, which includes determining the number of codewords based on the number of transmission layers. Because the codeword-to-layer mapping for spatial multiplexing is determined dynamically based on the number of transmission layers, the UE may determine an optimum precoding matrix for the codebook-based PUSCH transmission accordingly. This method may help to improve signal quality, increase data throughput, and reduce interference, leading to enhanced performance for the codebook-based PUSCH transmission.

Figure 2:
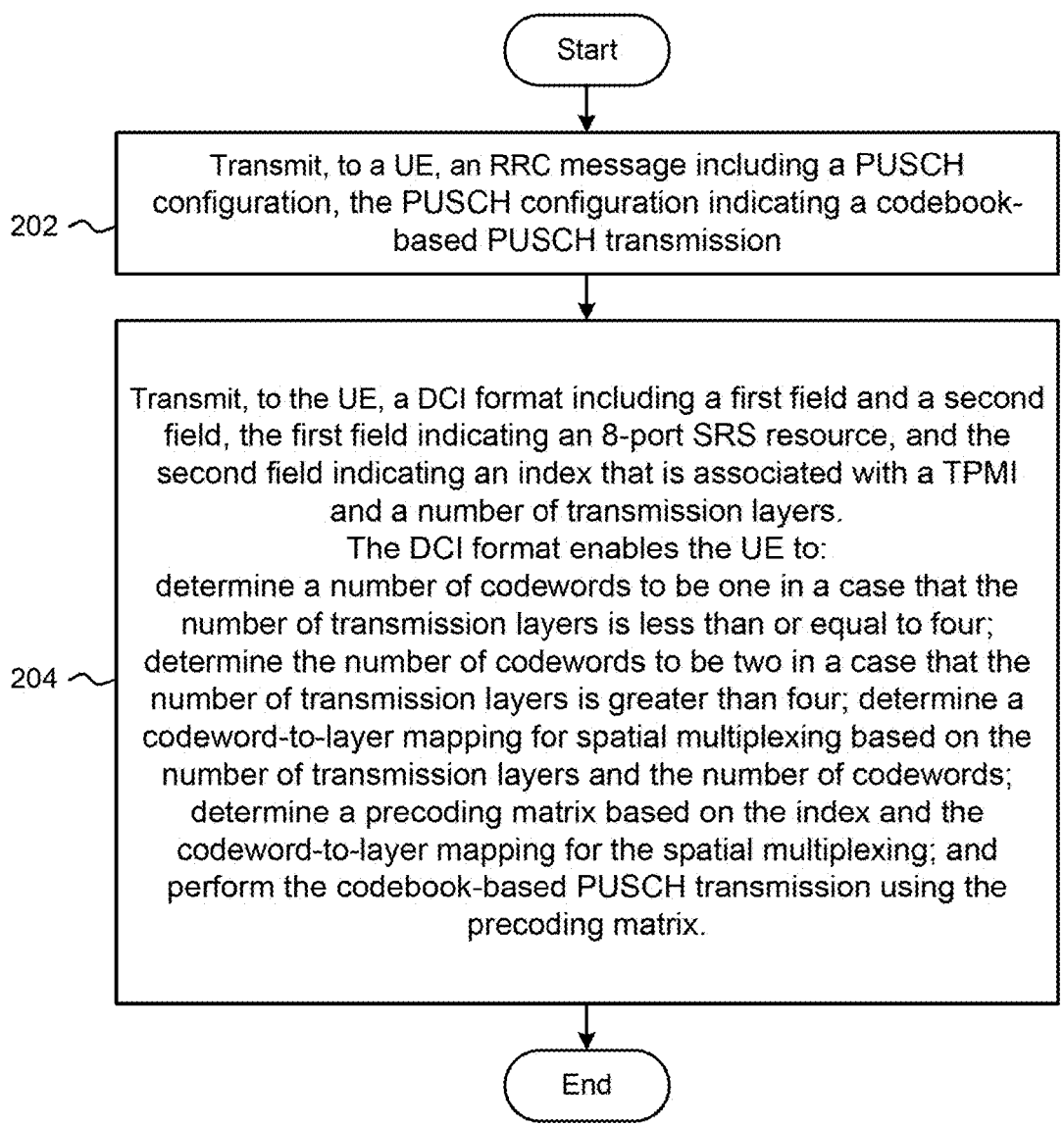
FIG. 2 is a flowchart illustrating a method/process performed by a BS for configuring codebook-based PUSCH transmission, according to an example implementation of the present disclosure.

FIG. 2 is a flowchart illustrating a method/process 200 performed by a BS for configuring codebook-based PUSCH transmission, according to an example implementation of the present disclosure. In some implementations, the process 200 may be performed by the BS.

In action 202, the process 200 may start by transmitting, to a UE, an RRC message including a PUSCH configuration. The PUSCH configuration may indicate a codebook-based PUSCH transmission. In action 204, the process may transmit, to the UE, a DCI format including a first field and a second field. The first field may indicate an 8-port SRS resource, and the second field may indicate an index that is associated with a TPMI and the number of transmission layers. The DCI format may enable the UE to: determine the number of codewords to be one in a case that the number of transmission layers is less than or equal to four; determine the number of codewords to be two in a case that the number of transmission layers is greater than four; determine a codeword-to-layer mapping for spatial multiplexing based on the number of transmission layers and the number of codewords; determine a precoding matrix based on the index and the codeword-to-layer mapping for the spatial multiplexing; and perform the codebook-based PUSCH transmission using the precoding matrix. The process 200 may then end.

The method illustrated in FIG. 2 is similar to that in FIG. 1, except that it is described from the perspective of the BS (instead of the UE).

Figure 3:
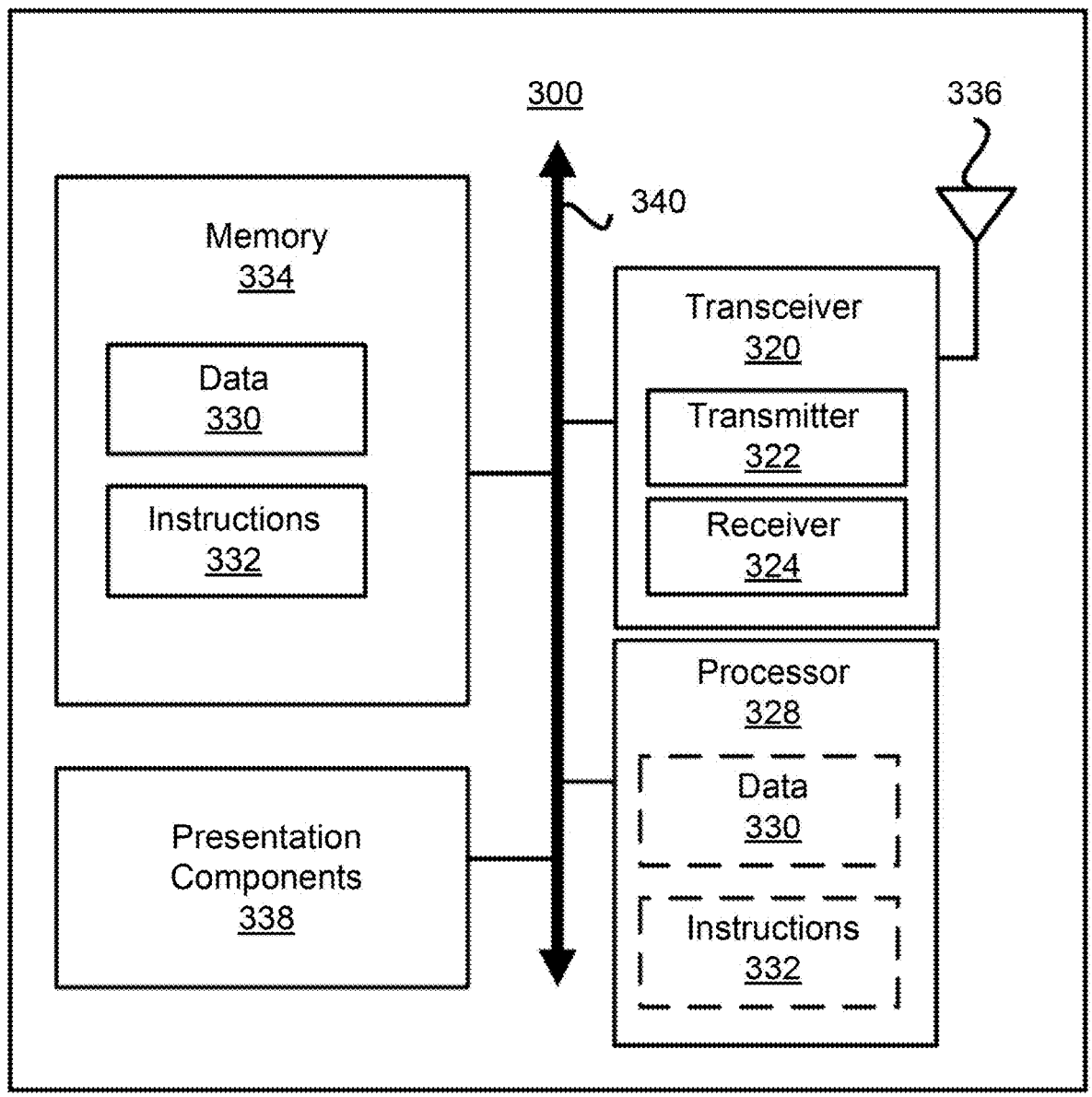
FIG. 3 is a block diagram illustrating a node for wireless communication, according to an example implementation of the present disclosure.

FIG. 3 is a block diagram illustrating a node 300 for wireless communication in accordance with various aspects of the present disclosure. As illustrated in FIG. 3, a node 300 may include a transceiver 320, a processor 328, a memory 334, one or more presentation components 338, and at least one antenna 336. The node 300 may also include a radio frequency (RF) spectrum band module, a BS communications module, a network communications module, and a system communications management module, Input/Output (I/O) ports, I/O components, and a power supply (not illustrated in FIG. 3).

Each of the components may directly or indirectly communicate with each other over one or more buses 340. The node 300 may be a UE or a BS that performs various functions disclosed with reference to FIGS. 1 through 2.

The transceiver 320 has a transmitter 322 (e.g., transmitting/transmission circuitry) and a receiver 324 (e.g., receiving/reception circuitry) and may be configured to transmit and/or receive time and/or frequency resource partitioning information. The transceiver 320 may be configured to transmit in different types of subframes and slots including, but not limited to, usable, non-usable, and flexibly usable subframes and slot formats. The transceiver 320 may be configured to receive data and control channels.

The node 300 may include a variety of computer-readable media. Computer-readable media may be any available media that may be accessed by the node 300 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the above listed components should also be included within the scope of computer-readable media.

The memory 334 may include computer-storage media in the form of volatile and/or non-volatile memory. The memory 334 may be removable, non-removable, or a combination thereof. Example memory may include solid-state memory, hard drives, optical-disc drives, etc. As illustrated in FIG. 3, the memory 334 may store a computer-readable and/or computer-executable instructions 332 (e.g., software codes) that are configured to, when executed, cause the processor 328 to perform various functions disclosed herein, for example, with reference to FIGS. 1 through 2. Alternatively, the instructions 332 may not be directly executable by the processor 328 but may be configured to cause the node 300 (e.g., when compiled and executed) to perform various functions disclosed herein.

The processor 328 (e.g., having processing circuitry) may include an intelligent hardware device, e.g., a Central Processing Unit (CPU), a microcontroller, an ASIC, etc. The processor 328 may include memory. The processor 328 may process the data 330 and the instructions 332 received from the memory 334, and information transmitted and received via the transceiver 320, the baseband communications module, and/or the network communications module. The processor 328 may also process information to send to the transceiver 320 for transmission via the antenna 336 to the network communications module for transmission to a CN.

One or more presentation components 338 may present data indications to a person or another device. Examples of presentation components 338 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for codebook-based Physical Uplink Shared Channel (PUSCH) transmission, the method comprising:
   receiving, from a Base Station (BS), a Radio Resource Control (RRC) message comprising a PUSCH configuration, the PUSCH configuration indicating a codebook-based PUSCH transmission;
   receiving, from the BS, a Downlink Control Information (DCI) format comprising a first field and a second field, the first field indicating an 8-port Sounding Reference Signal (SRS) resource, and the second field indicating an index that is associated with a Transmission Precoding Matrix Indicator (TPMI) and a number of transmission layers;
   determining a number of codewords to be one in a case that the number of transmission layers is less than or equal to four;
   determining the number of codewords to be two in a case that the number of transmission layers is greater than four;
   determining a codeword-to-layer mapping for spatial multiplexing based on the number of transmission layers and the number of codewords;
   determining a precoding matrix based on the index and the codeword-to-layer mapping for the spatial multiplexing; and
   performing the codebook-based PUSCH transmission using the precoding matrix.

2. The method of claim 1, wherein in the case that the number of transmission layers is less than or equal to four:
   a first codeword is used for the codeword-to-layer mapping for the spatial multiplexing, and
   complex-valued modulation symbols belonging to the first codeword are mapped to transmission layers in sequence.

3. The method of claim 1, wherein in the case that the number of transmission layers is greater than four:
   a first codeword and a second codeword are used for the codeword-to-layer mapping for the spatial multiplexing,
   in a case that the number of transmission layers is five, complex-valued modulation symbols belonging to the first codeword are mapped to first two transmission layers in sequence and complex-valued modulation symbols belonging to the second codeword are mapped to third to fifth transmission layers in sequence, in a case that the number of transmission layers is six, complex-valued modulation symbols belonging to the first codeword are mapped to first three transmission layers in sequence and complex-valued modulation symbols belonging to the second codeword are mapped to fourth to sixth transmission layers in sequence, in a case that the number of transmission layers is seven, complex-valued modulation symbols belonging to the first codeword are mapped to first three transmission layers in sequence and complex-valued modulation symbols belonging to the second codeword are mapped to fourth to seventh transmission layers in sequence, and in a case that the number of transmission layers is eight, complex-valued modulation symbols belonging to the first codeword are mapped to first four transmission layers in sequence and complex-valued modulation symbols belonging to the second codeword are mapped to fifth to eighth transmission layers in sequence when the number of transmission layers is eight.

4. The method of claim 1, wherein:
the PUSCH configuration further indicates a maximum transmission rank, a transform precoding configuration, and a codebook subset configuration, and
determining the precoding matrix comprises:
determining a dedicated table based on the maximum transmission rank, the transform precoding configuration, and the codebook subset configuration; and
determining the precoding matrix based on the dedicated table and the index.

5. The method of claim 4, wherein:
the maximum transmission rank is one of 1, 2, 4, and 8.

6. The method of claim 4, wherein:
the codebook subset configuration indicates a number of antenna groups,
transmission antenna ports that belong to a same antenna group are regarded as coherent, and
the number of antenna groups is one of 1, 2, 4, and 8.

7. The method of claim 6, wherein, in a case that the number of antenna groups is 2 or 4:
the index corresponds to a plurality of sub-indices,
the plurality of sub-indices is grouped into a plurality of pairs sequentially,
the number of the plurality of pairs is equal to the number of antenna groups, and
each of the plurality of pairs corresponds to a sub-precoding matrix that is applied to each antenna group.

8. The method of claim 7, wherein:
the plurality of pairs comprises a first pair and a second pair,
each of the first and second pairs comprises a first sub-index and a second sub-index,
the first sub-index corresponds to the number of transmission layers,
the second sub-index corresponds to a sub-TPMI, and
the first sub-index of the first pair is different from the first sub-index of the second pair.

9. The method of claim 1, wherein:
the first field comprises an SRS Resource Indicator (SRI).

10. A User Equipment (UE) for performing codebook-based Physical Uplink Shared Channel (PUSCH) transmission, the UE comprising:
at least one processor; and
at least one non-transitory computer-readable medium coupled to the at least one processor and storing one or more computer-executable instructions that, when executed by the at least one processor, cause the UE to:

receive, from a Base Station (BS), a Radio Resource Control (RRC) message comprising a PUSCH configuration, the PUSCH configuration indicating a codebook-based PUSCH transmission;
receive, from the BS, a Downlink Control Information (DCI) format comprising a first field and a second field, the first field indicating an 8-port Sounding Reference Signal (SRS) resource, and the second field indicating an index that is associated with a Transmission Precoding Matrix Indicator (TPMI) and a number of transmission layers;
determine a number of codewords to be one in a case that the number of transmission layers is less than or equal to four;
determine the number of codewords to be two in a case that the number of transmission layers is greater than four;
determine a codeword-to-layer mapping for spatial multiplexing based on the number of transmission layers and the number of codewords;
determine a precoding matrix based on the index and the codeword-to-layer mapping for the spatial multiplexing; and
perform the codebook-based PUSCH transmission using the precoding matrix.

11. The UE of claim 10, wherein in the case that the number of transmission layers is less than or equal to four:
a first codeword is used for the codeword-to-layer mapping for the spatial multiplexing, and
complex-valued modulation symbols belonging to the first codeword are mapped to transmission layers in sequence.

12. The UE of claim 10, wherein in the case that the number of transmission layers is greater than four:
a first codeword and a second codeword are used for the codeword-to-layer mapping for the spatial multiplexing,
in a case that the number of transmission layers is five, complex-valued modulation symbols belonging to the first codeword are mapped to first two transmission layers in sequence and complex-valued modulation symbols belonging to the second codeword are mapped to third to fifth transmission layers in sequence,
in a case that the number of transmission layers is six, complex-valued modulation symbols belonging to the first codeword are mapped to first three transmission layers in sequence and complex-valued modulation symbols belonging to the second codeword are mapped to fourth to sixth transmission layers in sequence,
in a case that the number of transmission layers is seven, complex-valued modulation symbols belonging to the first codeword are mapped to first three transmission layers in sequence and complex-valued modulation symbols belonging to the second codeword are mapped to fourth to seventh transmission layers in sequence, and
in a case that the number of transmission layers is eight, complex-valued modulation symbols belonging to the first codeword are mapped to first four transmission layers in sequence and complex-valued modulation symbols belonging to the second codeword are mapped to fifth to eighth transmission layers in sequence.

13. The UE of claim 10, wherein:
the PUSCH configuration further indicates a maximum transmission rank, a transform precoding configuration, and a codebook subset configuration, and determining the precoding matrix comprises:
  determining a dedicated table based on the maximum transmission rank, the transform precoding configuration, and the codebook subset configuration; and
  determining the precoding matrix based on the dedicated table and the index.

14. The UE of claim 13, wherein:
the maximum transmission rank is one of 1, 2, 4, and 8.

15. The UE of claim 13, wherein:
the codebook subset configuration indicates a number of antenna groups,
transmission antenna ports that belong to a same antenna group are regarded as coherent, and
the number of antenna groups is one of 1, 2, 4, and 8.

16. The UE of claim 15, wherein, in a case that the number of antenna groups is 2 or 4:
the index corresponds to a plurality of sub-indices,
the plurality of sub-indices is grouped into a plurality of pairs sequentially,
the number of the plurality of pairs is equal to the number of antenna groups, and
each of the plurality of pairs corresponds to a sub-precoding matrix that is applied to each antenna group.

17. The UE of claim 16, wherein:
the plurality of pairs comprises a first pair and a second pair,
each of the first and second pairs comprises a first sub-index and a second sub-index,
the first sub-index corresponds to the number of transmission layers,
the second sub-index corresponds to a sub-TPMI, and
the first sub-index of the first pair is different from the first sub-index of the second pair.

18. The UE of claim 10, wherein:
the first field comprises an SRS Resource Indicator (SRI).

19. A Base Station (BS) for configuring codebook-based Physical Uplink Shared Channel (PUSCH) transmission, the BS comprising:
  at least one processor; and
  at least one non-transitory computer-readable medium coupled to the at least one processor and storing one or more computer-executable instructions that, when executed by the at least one processor, cause the BS to:
    transmit, to a User Equipment (UE), a Radio Resource Control (RRC) message comprising a PUSCH configuration, the PUSCH configuration indicating a codebook-based PUSCH transmission; and
    transmit, to the UE, a Downlink Control Information (DCI) format comprising a first field and a second field, the first field indicating an 8-port Sounding Reference Signal (SRS) resource, and the second field indicating an index that is associated with a Transmission Precoding Matrix Indicator (TPMI) and a number of transmission layers, wherein the DCI format enables the UE to:
      determine a number of codewords to be one in a case that the number of transmission layers is less than or equal to four;
      determine the number of codewords to be two in a case that the number of transmission layers is greater than four;
      determine a codeword-to-layer mapping for spatial multiplexing based on the number of transmission layers and the number of codewords;
      determine a precoding matrix based on the index and the codeword-to-layer mapping for the spatial multiplexing; and
      perform the codebook-based PUSCH transmission using the precoding matrix.

20. The BS of claim 19, wherein:
in the case that the number of transmission layers is less than or equal to four:
  a first codeword is used for the codeword-to-layer mapping for the spatial multiplexing, and
  complex-valued modulation symbols belonging to the first codeword are mapped to transmission layers in sequence, and
in the case that the number of transmission layers is greater than four:
  the first codeword and a second codeword are used for the codeword-to-layer mapping for the spatial multiplexing,
  in a case that the number of transmission layers is five, complex-valued modulation symbols belonging to the first codeword are mapped to first two transmission layers in sequence and complex-valued modulation symbols belonging to the second codeword are mapped to third to fifth transmission layers in sequence,
  in a case that the number of transmission layers is six, complex-valued modulation symbols belonging to the first codeword are mapped to first three transmission layers in sequence and complex-valued modulation symbols belonging to the second codeword are mapped to fourth to sixth transmission layers in sequence,
  in a case that the number of transmission layers is seven, complex-valued modulation symbols belonging to the first codeword are mapped to first three transmission layers in sequence and complex-valued modulation symbols belonging to the second codeword are mapped to fourth to seventh transmission layers in sequence, and
  in a case that the number of transmission layers is eight, complex-valued modulation symbols belonging to the first codeword are mapped to first four transmission layers in sequence and complex-valued modulation symbols belonging to the second codeword are mapped to fifth to eighth transmission layers in sequence.

* * * * *